United States Patent [19]

Nakamura et al.

[11] Patent Number: 4,941,640
[45] Date of Patent: * Jul. 17, 1990

[54] VIBRATION ISOLATING APPARATUS

[75] Inventors: Ken Nakamura, Tokyo; Toshiaki Onoda, Yokohama; Yoshihiro Gofuku, Fujisawa, all of Japan

[73] Assignee: Tokico Ltd., Kanagawa, Japan

[*] Notice: The portion of the term of this patent subsequent to Aug. 16, 2005 has been disclaimed.

[21] Appl. No.: 154,848

[22] Filed: Feb. 10, 1988

Related U.S. Application Data

[62] Division of Ser. No. 841,449, Mar. 19, 1986, Pat. No. 4,763,869.

[30] Foreign Application Priority Data

| Mar. 20, 1985 | [JP] | Japan | 60-40926[U] |
| May 20, 1985 | [JP] | Japan | 60-74495[U] |
| Oct. 17, 1985 | [JP] | Japan | 60-157871[U] |
| Nov. 5, 1985 | [JP] | Japan | 60-170184[U] |

[51] Int. Cl.$^5$ ............................................. F16M 9/00
[52] U.S. Cl. ................................ 248/562; 52/167 R; 248/636; 248/638
[58] Field of Search ............... 248/562, 636, 638, 588, 248/419, 420, 421; 52/167

[56] References Cited

U.S. PATENT DOCUMENTS

| 2,414,506 | 6/1943 | Bowen . | |
| 3,212,745 | 10/1965 | Lode | 52/167 X |
| 3,908,940 | 9/1975 | Van Der Stricht . | |
| 4,371,143 | 2/1983 | Ishida et al. . | |
| 4,401,342 | 8/1983 | Andersson . | |
| 4,402,483 | 9/1983 | Kurabayashi et al. . | |
| 4,408,744 | 10/1983 | Thompson . | |
| 4,565,039 | 1/1986 | Oguro et al. | 52/167 |
| 4,577,826 | 3/1986 | Bergstrom et al. . | |
| 4,596,373 | 6/1986 | Omi et al. . | |
| 4,615,504 | 10/1986 | Sandercock . | |
| 4,662,133 | 5/1987 | Kondo | 52/167 |

FOREIGN PATENT DOCUMENTS

| 48314 | 10/1888 | Fed. Rep. of Germany . |
| 841379 | 6/1952 | Fed. Rep. of Germany . |
| 47543 | 3/1984 | Japan . |
| 1542279 | 3/1979 | United Kingdom . |
| 2042384 | 1/1980 | United Kingdom . |

*Primary Examiner*—David L. Talbott
*Attorney, Agent, or Firm*—Michael N. Meller

[57] ABSTRACT

A vibration isolating apparatus comprises an upper bed which is placed with an object thereon, a lower bed which directly receives a vibration caused by an earthquake, a support mechanism for supporting the upper bed so that the upper bed is relatively displaceable with respect to the lower bed in a horizontal direction with a small friction, a plurality of guide members separated from each other and provided on the upper and lower beds, a wire member provided around the guide members in a form of a loop, and a spring mechanism for absorbing a tension in the wire member depending on a deformation of a shape of the loop formed by the wire member due to a displacement of the lower bed with respect to the upper bed caused by the earthquake.

8 Claims, 6 Drawing Sheets

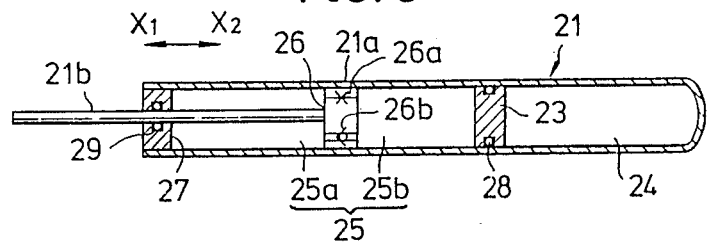
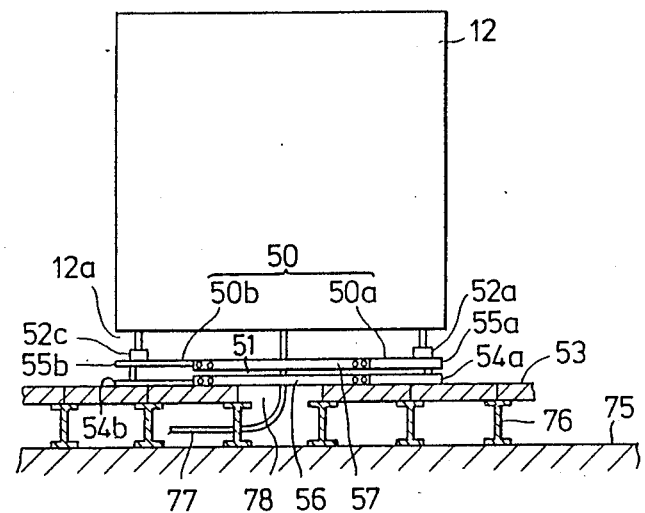
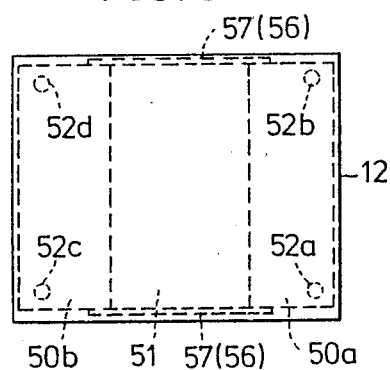

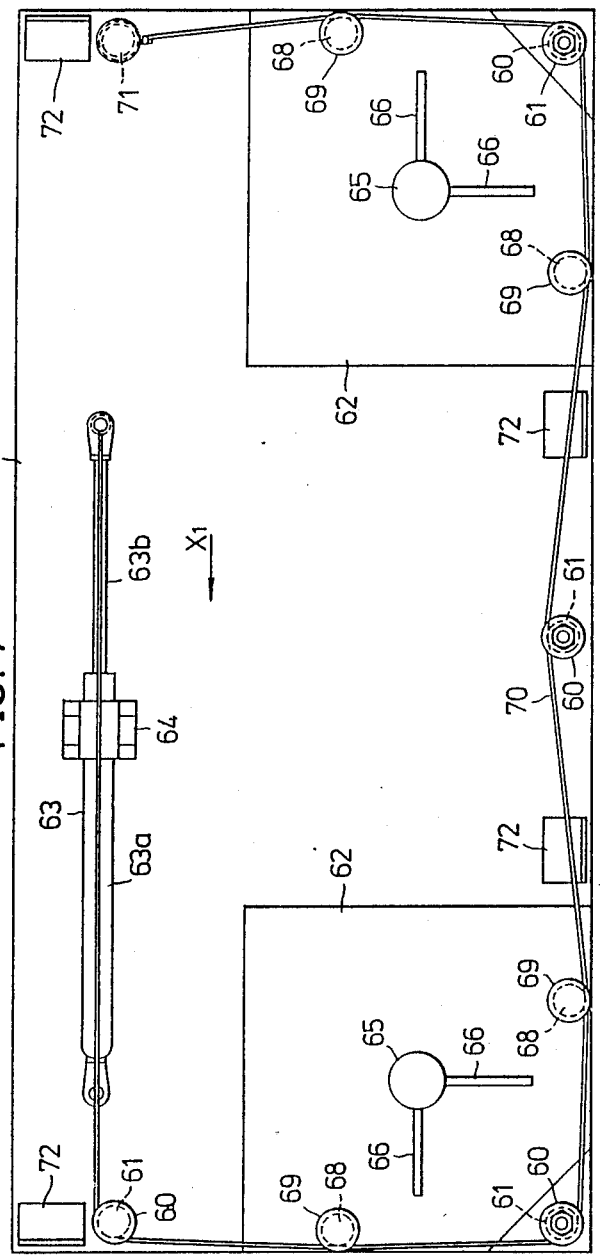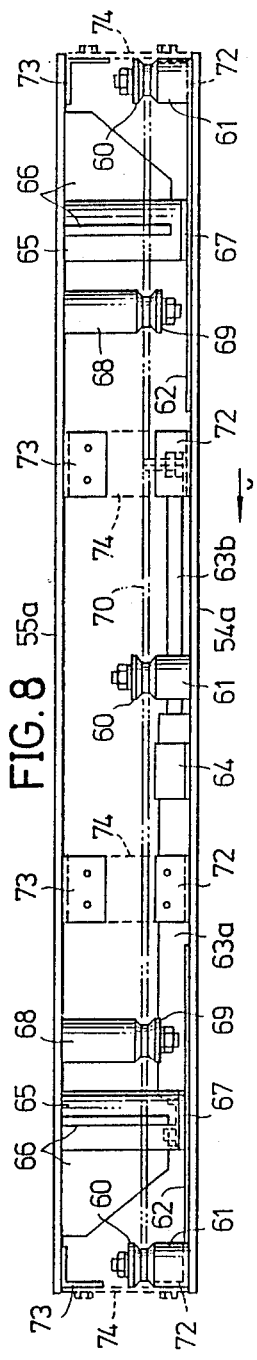
FIG. 7
FIG. 8

4,941,640

VIBRATION ISOLATING APPARATUS

RELATED APPLICATION

This application is a divisional application of U.S. Pat. Application Ser. No. 841,449 filed Mar. 19, 1986, now U.S. Pat. No. 4,763,869.

BACKGROUND OF THE INVENTION

The present invention generally relates to vibration isolating apparatuses, and more particularly to a vibration isolating apparatus which reduces effects of an earthquake vibration on an object which is placed on the vibration isolating apparatus so as to effectively prevent damage to the object by the earthquake.

Generally, an art object, a precision machine such as a computer, a tank for medical fluid, a shelf for keeping chemicals and the like must be prevented to the utmost from coming down, cracking, overflowing, falling and the like when an earthquake occurs. Accordingly, a vibration isolating apparatus has been conventionally proposed to prevent such an object of value, a precision machine, a dangerous object and the like from being damaged by the earthquake.

The conventional vibration isolating apparatus generally comprises a lower bed which is fixed to a floor of a building, an upper bed which is slideably provided on the lower bed and has an object placed thereon, and four coil springs which pull the outer periphery of the upper bed in four mutually perpendicular directions on a horizontal plane. When the earthquake occurs, a roll on the floor is resiliently absorbed directly by the coil springs, and the roll is prevented from being transmitted to the upper bed.

However, according to the conventional vibration isolating apparatus having the construction described above, the four coil springs apply mutually equal pulling forces on the outer periphery of the upper bed so that a center position of the upper bed coincides with a center position of the lower bed. The coil springs are maintained in a stretched state where the coil springs pull on the outer periphery of the upper bed, and the coil springs having a relatively large spring constant must be mounted in the stretched state. For this reason, there are disadvantages in that it is difficult to mount the coil springs and the mounting efficiency is poor.

When it is assumed that the earthquake vibration has an input period T1 and the vibration of the upper bed has a natural period T2, the input period T1 must be smaller than the natural period T2, and the vibration isolation effect is large when the natural period T2 is large, where the natural period T2 is determined by the spring constant of the coil spring and the mass of the object which is placed on the upper bed. But in order to improve the vibration isolation effect of the coil springs, it is necessary to make the spring constant small, increase the tension in the coil springs and increase the displaceable range of the lower bed with respect to the upper bed which should remain stationary even when there is a roll on the floor. Hence, according to the conventional vibration isolation apparatus which absorbs the vibration by the coil springs, a large mounting space is required when the vibration isolation effect is to be improved, but on the other hand, it is impossible to obtain a sufficiently large tension in the coil springs within a limited mounting space. As a result, there is a limit to improving the vibration isolation effect.

In the case where the object placed on the upper bed is a computer or the like which has a large weight, it is difficult to manually lift the heavy object and place it on the upper bed. But inside the building, it is difficult to use a lifting apparatus such as a crane. Hence, there is a disadvantage in that it is difficult to lift and place a heavy object on the upper bed of the vibration isolation apparatus. Furthermore, in the case where cables are provided under the floor and an electric machine is to be placed on the upper bed, it is necessary to provide on the upper and lower beds cutout parts for passing the cables so as to connect the cables to terminals which are located on a lower surface of the electric machine, for example. In addition, when the object to be placed on the upper bed is bulky, the overall size of the vibration isolation apparatus becomes large and heavy, and there is a disadvantage in that it is difficult to carry and move the vibration isolation apparatus.

SUMMARY OF THE INVENTION

Accordingly, it is a general object of the present invention to provide a novel and useful vibration isolation apparatus in which the disadvantages described heretofore are eliminated.

Another and more specific object of the present invention is to provide a vibration isolation apparatus comprising a lower bed which directly receives an earthquake vibration, an upper bed on which an object such as an art object, a precision machine and a tank for medical fluid is placed, and vibration isolating means provided between the upper and lower beds for absorbing and damping a displacement of the upper bed. The vibration isolating means comprises means for enabling a relative displacement of the lower bed with respect to the upper bed with a small friction such as a sliding friction and a rolling friction, and spring means such as a wire and a gas spring. According to the vibration isolating apparatus of the present invention, it is possible to make a spring constant of the spring means small within a limited mounting space, and further, it is possible to make a natural period of the vibration of the upper bed sufficiently large with respect to an input period of the earthquake vibration by making a displacement quantity of the spring means large, to thereby improve the vibration isolation effect. In addition, the mounting space for the vibration isolating means is small compared to a mounting space required in a conventional vibration isolating apparatus for mounting four coil springs under tension. The vibration isolating means can be mounted with ease and with a satisfactory mounting efficiency, and for this reason, it is possible to manufacture the vibration isolating apparatus at a low cost.

Still another object of the present invention is to provide a vibration isolating apparatus in which one vibration isolating block is constituted by the vibration isolating apparatus having the construction described above, and a plurality of such vibration isolating blocks are provided between the object and a floor of a building. According to the vibration isolating apparatus of the present invention, even an object having a large weight can be placed on the vibration isolating apparatus with ease, by tilting the object so as to raise one side of the object and put the vibration isolating block under the raised side of the object and thereafter successively putting the vibration isolating blocks under the remaining sides in a similar manner. The object can be placed on the vibration isolating apparatus with a small effort.

Moreover, cables provided under the floor can be connected to an apparatus which is placed on the vibration isolating blocks as the object, by passing the cables through spaces formed between the vibration isolating blocks, and the wiring of the cables is facilitated. Especially because the vibration isolating blocks are compact and light in weight, it is easy to carry and move the vibration isolating blocks, and it is possible to reduce the effort required to place the object on the vibration isolating apparatus and accordingly improve the efficiency of placing the object on the vibration isolating apparatus.

Other objects and further features of the present invention will be apparent from the following detailed description when read in conjunction with the accompanying drawings.

BRIEF DESCRIPTION OF THE DRAWINGS

FIG. 3 is a view showing a cross section of an example of a gas spring which is used in the vibration isolating apparatus shown in FIG. 1;

FIG. 5 is an elevation showing a third embodiment of the vibration isolating apparatus according to the present invention;

FIG. 6 is a plan view showing the vibration isolating apparatus shown in FIG. 5;

FIG. 7 is a plan view showing a vibration isolating block of the vibration isolating apparatus shown in FIG. 5;

FIG. 8 is a side view showing the vibration isolating block shown in FIG. 7;

DETAILED DESCRIPTION

Figure 1:
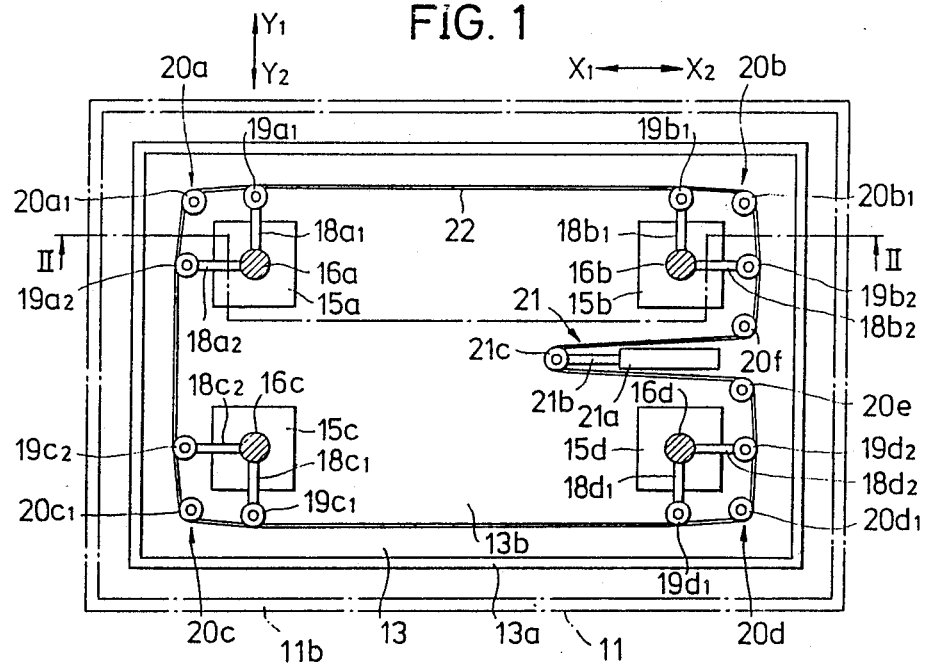
FIG. 1 is a plan view showing a first embodiment of the vibration isolating apparatus according to the present invention.
Figure 2:
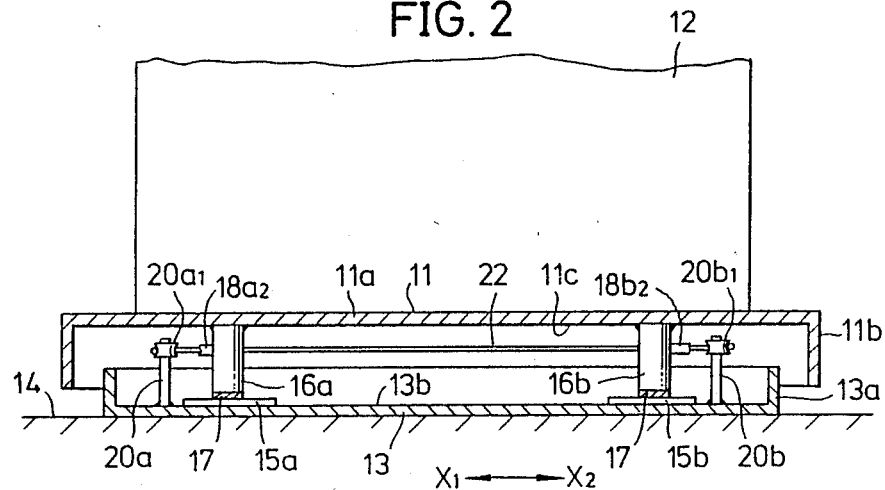
FIG. 2 is a view showing a vertical cross section of the vibration isolating apparatus along a line II—II in FIG. 1.

First, description will be given with respect to a first embodiment of the vibration isolating apparatus according to the present invention by referring to FIGS. 1 and 2.

An object 12 is placed on an upper surface 11a of an upper bed 11. The upper bed 11 comprises a peripheral portion 11b which projects downwardly from a peripheral edge thereof each of four sides thereof. A lower bed 13 is fixed to a founding surface 14 such as a floor of a building. The lower bed 13 comprises a peripheral portion 13a which projects upwardly from a peripheral edge thereof on each of four sides thereof. Slide plates 15a through 15d having slippery surfaces are fixed on an upper surface 13b of the lower bed 13 on the inside of the peripheral portions 13a.

The peripheral portions 11b of the upper bed 11 and the peripheral portions 13a of the lower bed 13 respectively have such projecting dimensions that one peripheral portion 11b can oppose one corresponding peripheral portion 13a. Hence, when an earthquake vibration exceeds a tolerance of the vibration isolating apparatus, the one peripheral portion 11b makes contact with the one corresponding peripheral portion 13a to act as stoppers. The peripheral portions 11b and the peripheral portions 13a cover the periphery of the upper and lower beds 11 and 13, and also act as means for preventing dust particles and the like from entering inside the vibration isolating apparatus.

Supports 16a through 16d are fixed to a lower surface 11c of the upper bed 11, and lower ends of the supports 16a through 16d are slideably provided on the respective slide plates 15a through 15d. Accordingly, the upper bed 11 is supported by the four supports 16a through 16d and is slideable in the horizontal direction with respect to the lower bed 13. In addition, a friction reducing member 17 having a small coefficient of friction is provided on the lower end of each of the supports 16a through 16d. Hence, by the provision of the friction reducing members 17 between the supports 16a through 16d and the slide plates 15a through 15d, the upper bed 11 can move smoothly in the horizontal direction with respect to the lower bed 13 without play.

The supports 16a through 16d comprise arms 18a1 through 18d1 and arms 18a2 through 18d2, respectively. Pulleys 19a1 through 19d1 are rotatably provided on tip ends of the arms 18a1 through 18d1, respectively. Pulleys 19a2 through 19d2 are rotatably provided on tip ends of the arms 18a2 through 18d2, respectively.

Guide members 20a through 20f respectively comprise pulleys 20a1 through 20f1 which are rotatably provided on upper ends of poles which are fixed on the upper surface 13b of the lower bed 13. A gas spring 21 is provided as spring means. The gas spring 21 comprises a cylinder portion 21a which has a high-pressure gas sealed therein and is fixed on the lower bed 13, a rod portion 21b which is displaceable with respect to the cylinder portion 21a, and a pulley 21c rotatably provided on a tip end of the rod portion 21b. A wire 22 is provided in a closed loop around the pulleys 20a1 through 20f1 of the guide members 20a through 20f and the pulley 21c of the gas spring 21. The pulleys 20a1 through 20f1, the pulleys 19a1 through 19d1 and the pulleys 19a2 through 19d2 respectively make contact with the wire 22 from inside the closed loop. On the other hand, the pulley 21c of the gas spring 21 makes contact with the wire 22 from outside the closed loop.

The gas spring 21 has a construction shown in FIG. 3, for example. The inside of the cylinder portion 21a is partitioned into a gas sealing chamber 24 and an operating oil chamber 25 by a free piston 23. High-pressure nitrogen gas is sealed inside the gas sealing chamber 24, and an operating oil is applied inside the operating oil chamber 25. A piston 26 is integrally provided on the rod portion 21b and partitions the operating oil chamber 25 into a left chamber 25a and a right chamber 25b. The piston 26 comprises an orifice 26a which communicates the left and right chambers 25a and 25b, and a check valve 26b which permits the operating oil in the right chamber 25b to move to the left chamber 25a. A guide 27 is inserted with the rod portion 21b and guides the rod portion 21b, and this guide 27 closes an opening in the cylinder portion 21a. A sealing member 28 is provided on an outer periphery of the free piston 23, so as to provide an airtight seal between the gas sealing chamber 24 and the operating oil chamber. In addition, a sealing member 29 is provided on an inner periphery of the guide 27 so as to prevent the operating oil from leaking outside the cylinder portion 21a. The construction of the gas spring 21 is not limited to that described above, and for example, it is possible to use a gas spring having no free piston.

The rod portion 21b of the gas spring 21 is pushed and displaced in a direction X1 due to the pressure of the gas inside the cylinder portion 21a. For this reason, the pulley 21c of the gas spring 21 displaces the wire 22 toward the inside of the closed loop, and a predetermined tension is applied to the wire 22. The pulleys 19a1 through 19d1 and the pulleys 19a2 through 19d2 respectively project outwardly from an imaginary square closed loop connecting the pulleys 20a1 through 20d1 of the guide members 20a through 20d. Thus, the pulleys 19a1 through 19d1 and the pulleys 19a2 through 19d2 respectively make contact with the wire 22 which is provided around each of the guide members 20a through 20d.

When an earthquake occurs, the founding surface 14 and the lower bed 13 of the vibration isolating apparatus sway horizontally in directions X1 and X2 together with the building. On the other hand, the upper bed 11 and the object 12 placed on the upper bed 11 tend to remain stationary due to the static inertia. Accordingly, when the lower bed 13 moves in the direction X1, the slide plates 15a through 15d slide in the direction X1 with respect to the supports 16a through 16d of the upper bed 11 having the object 12 placed thereon. The pulleys 20a1 and 20c1 of the guide members 20a and 20c pull the wire 22 in the direction X1, while the pulleys 19b2 and 19d2 which project in the direction X2 from the respective supports 16b and 16d relatively push the wire 22 in the direction X2. As a result, the shape of the closed loop formed by the wire 22 is stretched in the directions X1 and X2 accompanying the rotation of the pulleys 19a1 through 19d1, 19a2 through 19d2 and 20a1 through 20d1. The wire 22 displaces the pulley 21c and the rod portion 21b of the gas spring 21 in the direction X2 by a quantity corresponding to an amount the shape of the closed loop is stretched, and the stretch in the shape of the closed loop is absorbed by the gas spring 21.

Therefore, the earthquake vibration is converted into the displacement of the wire 22 which tends to spread the shape of the closed loop toward the outside, and furthermore, the tension in the wire 22 is resiliently absorbed by the contraction of the gas spring 21.

When the lower bed 13 sways in the direction X2 together with the founding surface 14, the pulleys 20b1 and 20d1 similarly pull the wire 22, the pulleys 19a2 and 19c2 relatively push the wire in the direction X1 and the shape of the closed loop formed by the wire 22 is stretched in the directions X1 and X2. The stretch in the shape of the closed loop is resiliently absorbed by the contraction of the gas spring 21 via the wire 22.

When the earthquake stops and the lower bed 13 stops swaying, the upper and lower beds 11 and 13 are returned to the respective original center positions by the pushing force of the gas spring 21 which tends to restore the shape of the closed loop formed by the wire 22 via the wire 22, because the pulleys 19a1 through 19d1 and 19a2 through 19d2 are respectively surrounded b the wire 22 under tension.

In addition, in the case the lower bed 13 sways in a direction Y1 or Y2, the shape of the closed loop formed by the wire 22 is deformed by the action of the pulleys 20a1 20b1, 19c1 and 19d1 or by the action of the pulleys 20c1, 20d1, 19a1 and 19b1. This deformation of the shape of the closed loop is absorbed by the contraction of the gas spring 21.

Accordingly, the gas spring 21 resiliently absorbs the deformation in the shape of the closed loop formed by the wire 22 caused by the swaying of the lower bed 13, and the object 12 is prevented from being damaged by the earthquake since the swaying of the upper bed 11 and the object 12 placed on the upper bed 11 due to the earthquake are effectively suppressed.

In addition, the gas spring 21 does not directly receive the displacement of the lower bed 13 with respect to the upper bed 11, but the gas spring 21 is compressed by the tension in the wire 22 and this tension is dependent on the deformation of the shape of the closed loop formed by the wire 22. For this reason, the displacement quantity of the gas spring 22 is smaller than the displacement quantity between the upper and lower beds 11 and 13. Thus, the gas spring 21 can absorb a large displacement compared to the case where the displacement is absorbed directly and not via the wire 22.

When it is assumed that the earthquake vibration has an input period T1 and the vibration of the upper bed 11 has a natural period T2, the natural period T2 can be made sufficiently large throughout the entire stroke range of the gas spring 21 the because the spring constant of the gas spring 21 is small. Consequently, compared to the conventional vibration isolating apparatus in which the sway in the lower bed is directly absorbed by the coil springs, a ratio between the periods T1 and T2 can be made large according to the present embodiment, where T1 is smaller than T2, and it is therefore possible to improve the vibration isolation effect. On the other hand, the spring constant of the gas spring 21 can be set arbitrarily by adjusting the pressure of gas sealed inside the cylinder portion 21a of the gas spring 21.

Furthermore, in the case of the coil spring which accompanies a bend when it is resiliently displaced, it is necessary to make the initial displacement large in order to obtain a large initial force. But the gas spring 21 has a large initial force, and the reaction force gradually becomes large according to the displacement quantity. Hence, the use of the gas spring 21 is advantageous in improving the vibration isolation effect.

The gas spring 21 absorbs the sway displacement in various directions, and only one gas spring 21 is required as the spring means. Hence, it is possible to effectively utilize a limited mounting space on the inside of the lower bed 13 for mounting the spring means (gas spring 21), and the vibration isolating apparatus can be downsized. Therefore, the spring means can be mounted with ease, and the vibration isolating apparatus can be manufactured at a low cost.

In the present embodiment, the gas spring 21 is used as the spring means. However, the spring means is not limited to the gas spring 21, and for example, it is possible to use a coil spring, a torsion spring and the like. Furthermore, in the present embodiment, the guide members, the wire and the gas spring are respectively provided on the lower bed and the supports are fixed to the upper bed. But for example, it is also possible to provide the supports on the lower bed and provide the guide members, the wire and the gas spring on the upper bed. In addition, the number of the supports and the number of the guide members are not limited to those of the present embodiment. Accordingly, the shape of the closed loop formed by the wire is not limited to that shown in FIG. 1, and it is possible to obtain effects similar to those obtained in the present embodiment by use of closed loops having other shapes.

In the present embodiment, the pulleys making contact with the wire are designed to project horizontally from the respective supports. However, the arrangement of the pulleys is not limited to that of the present embodiment, and for example, it is possible to make the pulleys project from the upper bed and not from the supports. The members making contact with the wire are of course not limited to the pulleys, and any member having a slippery curved surface may be used instead.

Figure 4:
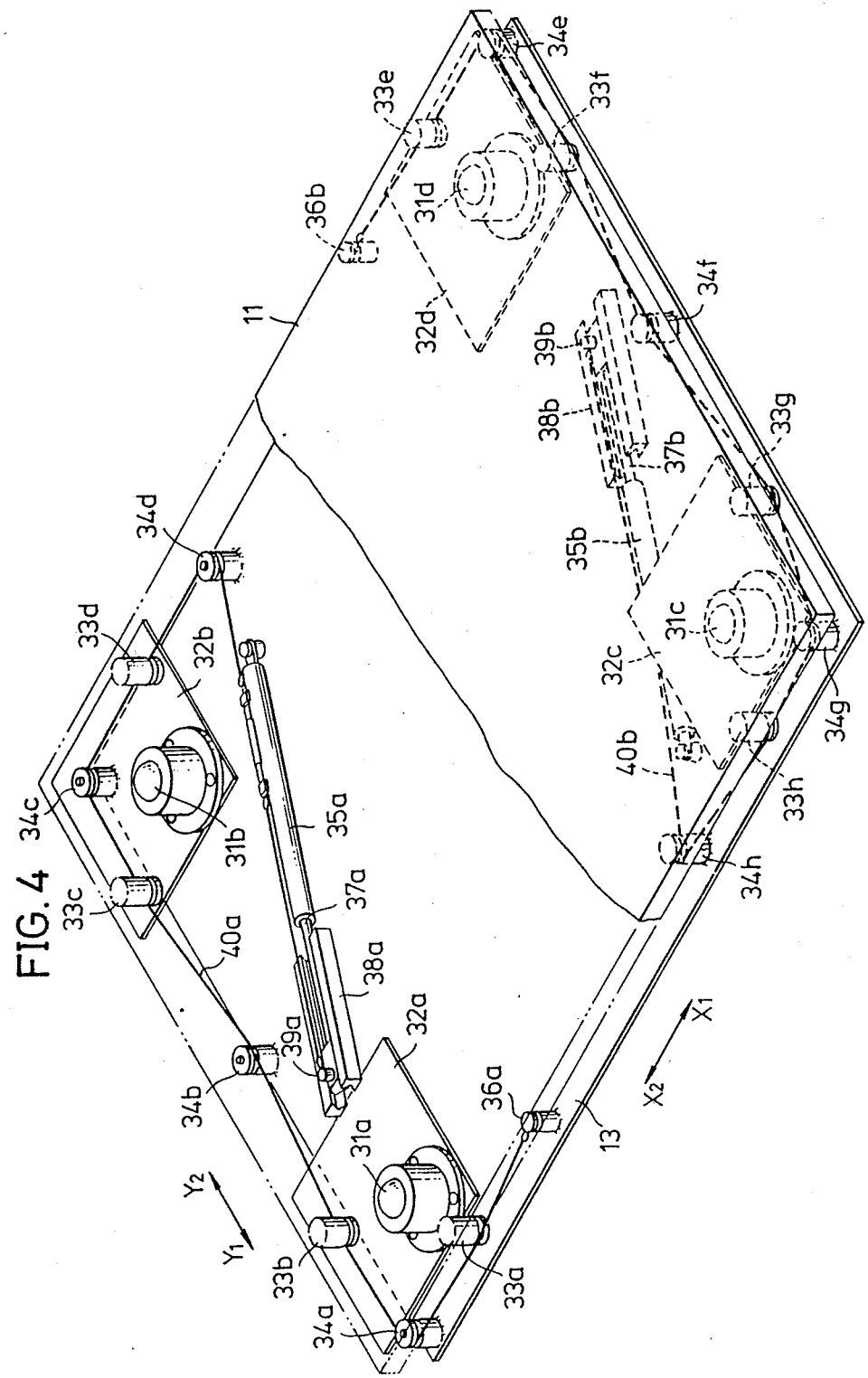
FIG. 4 is a perspective view with a part cut away, showing a second embodiment of the vibration isolating apparatus according to the present invention.

Next, description will be given with respect to a second embodiment of the vibration isolating apparatus according to the present invention by referring to FIG. 4.

Spherical bearings 31a through 31d are provided on the lower bed 13 at the four corners thereof. Friction reducing plates 32a through 32d having a hardness are provided on the lower surface of the upper bed 11 at the four corners thereof. The upper bed 11 is arranged on the lower bed 13 by placing the friction reducing plates 32a through 32d in contact with the corresponding spherical bearings 31a through 31d. Upper pulleys 33a through 33d are provided on the lower surface of the upper bed 11, and lower pulleys 34a through 34d are provided on the upper surface of the lower bed 13. Gas springs 35a and 35b are fixed on the lower bed 13. An engaging pin 36a is provided on the lower bed 13. An engaging pin 39a is provided on a tip end of a rod portion 37a of the gas spring 35a and is guided by a guide rail 38a. A wire 40a is provided in an open loop between the engaging pins 36a and 39 via the pulleys 33a, 34a, 33b, 34b, 33c, 34c, 33d and 34d. Similarly, a symmetrical arrangement is provided on the side of the spherical bearings 31c and 31d and the gas spring 35b. That is, upper pulleys 33e through 33h are provided on the lower surface of the upper bed 11, and lower pulleys 34e through 34h are provided on the upper surface of the lower bed 13. An engaging pin 36b is provided on the lower bed 13. An engaging pin 39b on a tip end of a rod portion 37b of the gas spring 35b and is guided by a guide rail 38b. A wire 40b is provided in an open loop between the engaging pins 36b and 39b via the pulleys 33e, 34e, 33f, 34f, 33g, 34g, 33h and 34h. An open portion of the open loop formed by the wire 40a opposes an open portion of the open loop formed by the wire 40b.

When the earthquake occurs and the lower bed 13 moves in the direction X1, for example, the upper bed 11 tends to remain stationary due to the static inertia. The lower pulleys 34a, 34b and 34c act on the wire 40a so as to stretch the wire 40a with respect to the upper pulleys 33a, 33b and 33c. The force which acts on the wire 40a is absorbed by the compression of the rod portion 37a of the gas spring 35a. At the same time, the lower pulleys 34e, 34f and 34g act on the wire 40b so as to separate the wire 40b from the upper pulleys 33e, 33f and 33g.

When the lower bed 13 moves in the direction X2, the lower pulleys 34e through 34g on the opposite side act on the wire 40b so as to stretch the wire 40b with respect to the upper pulleys 33e through 33g, and the force which acts on the wire 40b is absorbed by the compression of the rod portion 37b of the gas spring 35b.

On the other hand, when the lower bed 13 moves in the direction Y1 the wires 40a and 40b are respectively pulled by the lower pulleys 34a and 34g. The forces which act on the wires 40a and 40b so as to stretch the wires 40a and 40b with respect to the respective upper pulleys 33d and 33e, are respectively absorbed by the gas springs 35a and 35b. Similarly, when the lower bed 13 moves in the direction Y2, the wires 40a and 40b are respectively pulled by the lower pulleys 34c and 34e. The forces which act on the wires 40a and 40b so as to stretch the wires 40a and 40b with respect to the respective upper pulleys 33a and 33h, are respectively absorbed by the gas springs 35a and 35b.

According to the present embodiment, a pair of vibration isolating mechanisms are provided instead of providing a closed loop around the entire inner periphery of the vibration isolating apparatus. Hence, the present embodiment is especially effective in the case where the upper and lower beds 11 and 13 have a large area.

Next, description will be given with respect to a third embodiment of the vibration isolating apparatus according to the present invention by referring to FIGS. 5 through 9.

According to the third embodiment, a vibration isolating apparatus 50 comprises a pair of vibration isolating blocks (hereinafter simply referred to as blocks) 50a and 50b. The blocks 50a and 50b respectively are smaller than an area of a lower surface 12a of the object 12 which is placed on the vibration isolating apparatus 50. The blocks 50a and 50b are arranged with a predetermined separation in accordance with the size of the lower surface 12a. Thus, a space 51 is formed between the pair of blocks 50a and 50b. The object 12 has four legs 52a through 52d, and the legs 52a and 52b are placed on the block 50a while the legs 52c and 52d are placed on the other block 50b.

The blocks 50a and 50b respectively comprise lower plates 54a and 54b which are fixed to a floor 53 as will be described later on in the specification, and upper plates 55a and 55b which are slideably supported with respect to the lower plates 54a and 54b. The upper plates 55a and 55b are slideable in the horizontal direction, and the legs 52a and 52b of the object 12 are placed on the upper plate 55a while the legs 52c and 52d of the object 12 are placed on the upper plate 55b. The mutually separated blocks 50a and 50b are connected by a lower plate connecting member 56 which connects the lower plates 54a and 54b, and by an upper plate connecting member 57 which connects the upper plates 55a and 55b. The two ends of the connecting member 56 are secured to the lower plates 54a and 54b by screws, and the two ends of the connecting member 57 are secured to the upper plates 55a and 55b by screws. For this reason, when the floor 53 sways in the horizontal direction, the lower plates 54a and 54b slide unitarily with respect to the upper plates 55a and 55b. Therefore, the pair of blocks 50a and 50b act unitarily on the object 12, and the legs 52a through 52d of the object 12 will not fall off the blocks 50a and 50b.

Description will now be given with respect to the blocks 50a and 50b by referring to FIGS. 7 and 8. The blocks 50a and 50b have constructions which are mutually symmetrical to the right and left, and the construction of the block 50a is essentially the same as the construction of the block 50b. Hence, description will only be given with respect to the construction of the block 50a, and the description on the other block 50b will be omitted.

A shaft (guide member) 61 which supports a pulley 60 on a tip end thereof is provided at four positions on the upper surface of the lower plate 54a. Slide plates 62 are adhered at outer corners on the upper surface of the lower plate 54a. A main body 63a of a gas spring 63 is fixed on the lower plate 54a via a fixing member 64.

A pair of supports 65 for supporting the upper plate 55a project downwardly from the upper plate 55a. Since the supports 65 support the object 12 via the upper plate 55a, each support 65 comprises a rib 66 so that it can withstand the weight of the object 12. Each support 65 has a friction reducing member 67 provided on a tip end thereof, and the supports 65 make contact with the slide plates 62 on the lower plate 54a via the friction reducing members 67.

A shaft 68 which supports a pulley 69 on a tip end thereof and projects downwardly from the lower surface of the upper plate 55a is provided at four positions so that the shaft 61 and the shaft 68 are arranged alternately. A wire 70 is provided around each of the pulleys 60 and 69. One end of this wire 70 is fixed to an engaging pin 71, and the other end of this wire 70 is fixed to a tip end of a piston rod 63b of the gas spring 63.

Accordingly, when the floor 53 sways due to the earthquake and the lower plate 54a moves horizontally with respect to the upper plate 55a, the pulleys 60 move so as to deform the shape of the loop formed by the wire 70. The piston rod 63b of the gas spring 63 resiliently absorbs the deformation in the shape of the loop formed by the wire 70 by moving in the direction X1. Because the slide plates 62 and the friction reducing members 67 exist between the upper and lower plates 55a and 54a, the upper and lower plates 55a and 54a can slide smoothly relative to each other. As a result, it is possible to prevent the object 12 placed on the upper plate 55a from being affected by the earthquake, and the swaying of the upper plate 55a is prevented.

Connecting plates 72 having an L-shape are provided on the upper surface of the lower plate 54a. Connecting plates 73 are provided on the lower surface of the upper plate 55a. The connecting plates 73 oppose the corresponding connecting plates 72 provided on the lower plate 54a. While the blocks 50a and 50b are being carried and until the blocks 50a and 50b are set on the floor 53, fixing plates 74 indicated by phantom lines in FIG. 8 fix the corresponding connecting plates 72 and 73 together so that the upper and lower plates 55a and 54a will not move relative to each other. After the blocks 50a and 50b are set on the floor 53, the fixing plates 74 are removed from the connecting plates 72 and 73, and the two ends of the lower connecting member 56 described before are secured to the lower plates 54a and 54b by the screws while the two ends of the upper connecting member 57 described before are secured to the upper plates 55a and 55b by the screws.

Figure 9:
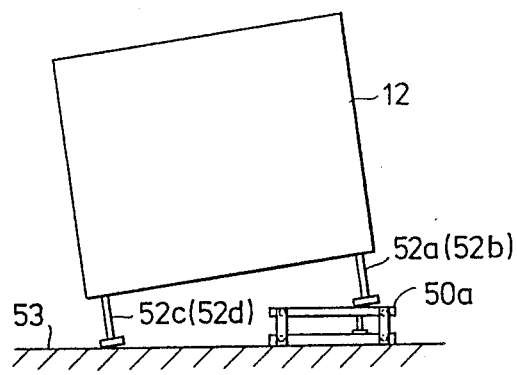
FIG. 9 is a side view for explaining a manner in which an object is placed on the vibration isolating block.

When placing the object 12 on the blocks 50a and 50b, the object 12 is lifted on the side thereof having the legs 52a and 52b by using the legs 52c and 52d on the other side as points of support, so as to tilt the object 12 as shown in FIG. 9. Next, the block 50a is inserted between the floor 53 and the lifted legs 52a and 52b, and the legs 52a and 52b are lowered and placed on the block 50a. Then, the object 12 is lifted on the side thereof having the legs 52c and 52d by using the legs 52a and 52b on the other side as points of support, so as to tilt the object 12. Thereafter, the block 50b is inserted between the floor 43 and the lifted legs 52c and 52d, and the legs 52c and 52d are lowered and plated on the block 50b.

Hence, the legs 52a and 52b and the legs 52c and 52d of the object 12 can successively be placed on the respective blocks 50a and 50b with a reasonable effort, by successively tilting the object 12 on one side. For this reason, the object 12 can be placed on the vibration isolating apparatus 50 with ease and with only a small effort. Accordingly, it is unnecessary to use a crane or the like to lift the object 12 even when the object 12 is heavy, and it is possible to place the object 12 on the vibration isolating apparatus 50 by a small number of persons.

The floor 53 on which the vibration isolating apparatus 50 is set, is supported by a plurality of supports 76 on a foundation floor 75 which is made of concrete and is formed by a plurality of floor plates which are arranged in-plane, as shown in FIG. 5. Connecting cables 77 are provided between the floor 53 having such a construction and the foundation floor 75.

The cables 77 provided along the bottom of the floor 53 pass through an opening 78 between the adjacent floor plates of the floor 53 and through the space 51 between the pair of blocks 50a and 50b, and are connected to terminals on the lower surface 12a of the object 12 in the case where the object 12 is an electrical machine or the like. Hence, the operation of connecting the cables 77 to the object 12 can be performed with ease.

Since the independent blocks 50a and 50b are compact and light in weight, it is easy to carry and move the blocks 50a and 50b before the blocks 50a and 50b are set up and used as the vibration isolation apparatus 50. Furthermore, the blocks 50a and 50b can be set up with ease.

In the case where a room which is to keep the object 12 needs to maintain a constant temperature by use of an air conditioning apparatus, the control of the temperature by the air conditioning from the floor 53 will not be interfered with because the space 51 is formed between the pair of blocks 50a and 50b and the ventilation between the object 12 and the floor 53 is satisfactory.

In each of the embodiments described heretofore, the coefficient of friction of the slide plates 15a through 15d and the friction reducing members 17, the coefficient of friction of the spherical bearings 31a through 31d and the slide plates 32a through 32d, and the coefficient of friction of the slide plates 62 and the friction reducing members 67 are respectively set to an extremely small value. For this reason, in the case where the object is light in weight, the upper bed will move with respect to the lower bed even when only a small force is applied to the object, such as the case when a person pushes the object, for example. Hence, description will now be given with respect to a fourth embodiment which is designed so that the movement of the upper bed responsive to a relatively small force is prevented and the vibration isolating operation is only started when an acceleration over a predetermined value acts on the vibration isolating apparatus. The vibration isolating mechanism itself can be the same as those of the embodiments described heretofore, and the illustration and description of the vibration isolating mechanism of the vibration isolating apparatus will be omitted.

Figure 10:
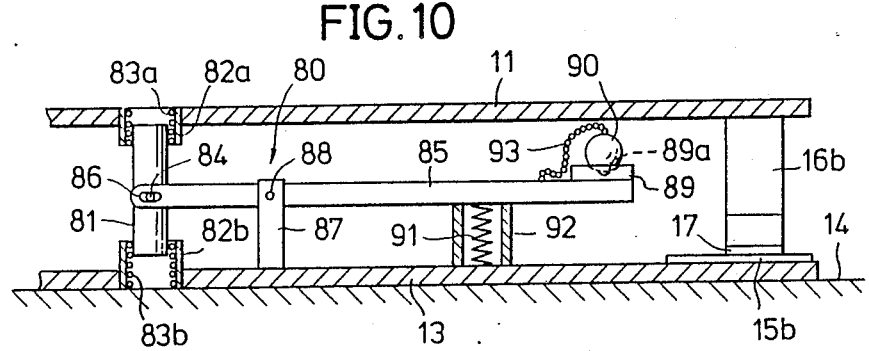
FIG. 10 is a side view showing an essential part of a fourth embodiment of the vibration isolating apparatus according to the present invention.

In FIG. 10, an upper part of a fixing rod 81 is normally inserted into a tubular portion 82a of the upper bed 11, and a lower part of the fixing rod 81 is inserted into a tubular portion 82b of the lower bed 13. Thus, the upper bed 11 is essentially locked to the lower bed 13 by the fixing rod 81, and the upper bed 11 cannot slide with respect to the lower bed 13.

Thrust bearings 83a and 83b are provided on the inner peripheries of the respective tubular portions 82a and 82b, and the fixing rod 81 can smoothly move up and down within the tubular portions 82a and 82b.

A pin 84 is provided at an approximate center of the fixing rod 81, and this pin 84 fits into an elongated hole 86 which is provided on one end of a lever 85. The lever 85 is rotatably supported on a support 87 by a pin 88. A receiving part 89 having a depression 89a is provided on the other end of the lever 85. An iron ball 90 is placed on the depression 89a of the receiving part 89, and the lever 85 is angularly rotated clockwise due to the weight of the iron ball 90.

A coil spring 91 accommodated within a spring guide 92 urges the lever 85 upwardly. When the iron ball 90 is on the receiving part 89, the lever 85 is angularly rotated clockwise against the force exerted by the coil spring 91, and the lever 85 is maintained in a horizontal state making contact with an upper surface of the spring guide 92. A lock mechanism 80 is constituted by the parts having the construction described above.

Normally, the weight of the iron ball 90 acts on the lever 85, and the fixing rod 81 engages the tubular portion 82a of the upper bed 11 and the tubular portion 82b of the lower bed 13 to fix the upper bed 11 in a locked state where the upper bed 11 cannot slide with respect to the lower bed 13. For this reason, the upper bed 11 is stable and will not be moved by a small force.

When the earthquake occurs and the earthquake vibration is small, the iron ball 90 remains on the receiving part 89. Hence, the upper bed 11 remains locked to the lower bed 13 by the action of the lever 81.

However, when the earthquake vibration is over a predetermined degree, the iron ball 90 escapes from the depression 89a and falls off the receiving part 89 because the acceleration becomes large. The iron ball 90 is connected to the lever 85 by a chain 93. When the iron ball falls off the receiving part 89, the weight of the iron ball 90 no longer acts on the lever 85, and the lever 85 quickly and angularly rotates counterclockwise about the pin 88 due to the force exerted by the coil spring 91. Consequently, the fixing rod 81 moves downwardly and the upper part thereof separates from the tubular portion 82a of the upper bed 11. As a result, the locking of the upper bed 11 to the lower bed 13 is cancelled, and the upper bed 11 and the lower bed 13 become movable relative to each other. Therefore, the vibration isolation effect described before are obtained by the vibration isolating mechanism described before.

The vibration isolating apparatus may be designed to operate when the earthquake vibration is over the predetermined degree by designing the shape of the depression 89a of the receiving part 89 so that the iron ball 90 falls off the receiving part 89 only when the earthquake vibration is over the predetermined degree.

Figure 11:
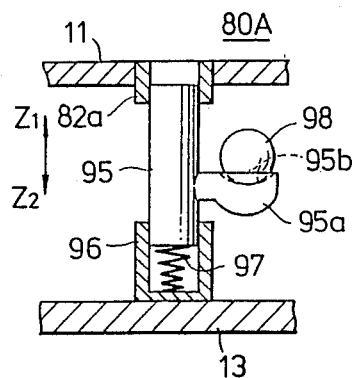
FIG. 11 is an elevation in vertical cross section showing a modification of the vibration isolating apparatus shown in FIG. 10.

A modification of the lock mechanism 80 shown in FIG. 10 is shown as a lock mechanism 90A in FIG. 11. An upper part of a fixing rod 95 is inserted into the tubular portion 82a of the upper bed 11, and a lower part of the fixing rod 95 is inserted into a tubular portion 96 fixed to the lower bed 13. The fixing rod 95 is urged upwardly by the pushing force exerted by a spring 97.

The fixing rod 95 integrally comprises a receiving part 95a, and an iron ball 98 is placed on a depression 95b of the receiving part 95a. The pushing force of the spring 97 is set so as to be balanced with the weights of the iron ball 98 and the fixing rod 95.

Normally, when there is no earthquake or when the earthquake vibration is small, or when the object on the upper bed 11 is pushed by a person, the upper bed 11 is locked to the lower bed 13 by the fixing rod 95 which is inserted into the tubular portions 82a and 96. Hence., the object on the upper bed 11 is maintained in a stable state. On the other hand, when the earthquake vibration is over a predetermined degree, the iron ball 98 escapes from the depression 95b and falls off the receiving part 95a. As a result, the fixing rod 95 moves upwardly by the force exerted by the spring 97, and the lower part of the fixing rod 95 separates from the tubular portion 96. Accordingly, the locking of the upper bed 11 with respect to the lower bed 13 is cancelled and the vibration isolating operation is performed.

In the embodiment and modification shown in FIGS. 10 and 11, the upper bed 11 is normally locked with respect to the lower bed 13, and the locking is cancelled when the earthquake vibration is over a predetermined degree. However, it is possible to normally brake the upper bed 11 and release the braking when the earthquake vibration is over the predetermined value, as shown in FIG. 12.

Figure 12:
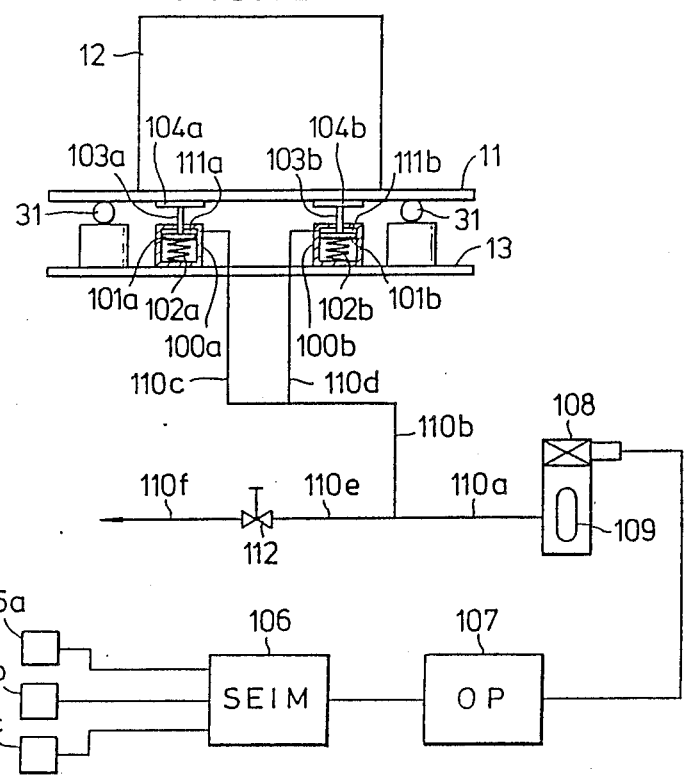
FIG. 12 is a system diagram showing a fifth embodiment of the vibration isolating apparatus according to the present invention.

FIG. 12 shows a fifth embodiment of the vibration isolating apparatus according to the present invention. In FIG. 12, cylinders 100a and 100b are fixed on the lower bed 13. Pistons 101a and 101b are slideably provided in the respective cylinders 100a and 100b, and these pistons 101a and 101b can slide upwardly and downwardly. The pistons 101a and 101b are urged upwardly by respective spring means 102a and 102b provided between the pistons 101a and 101b and bottoms of the cylinders 100a and 100b. The spring means 102a and 102b respectively comprise a plurality of coned disc springs. Pads 104a and 104b having a large coefficient of friction are provided on upper ends of respective rods 103a and 103b of the pistons 101a and 101b. Normally, the pistons 101a and 101b are urged upwardly by the respective spring means 102a and 102b and are in raised positions, and the pads 104a and 104b push against the lower surface of the upper bed 11. Due to the frictional force between the lower surface of the upper bed 11 and the pads 104a and 104b, the upper bed 11 is braked and is prevented from moving unnecessarily responsive to small forces which act on the upper bed 11 due to earthquake vibration under a predetermined degree, unwanted external vibration, unwanted contact between a person and the upper bed 11 and the like.

On the other hand, an appropriate number of seismoscopes are provided at appropriate locations. For example, three seismoscopes 105a, 105b and 105c are provided, and these seismoscopes 105a through 105c respectively generate a detection signal when the earthquake is detected. A seismoscope box 106 generates a signal when the detection signal is received from two or more seismoscopes. An operation box 107 receives the signal from the seismoscope box 106 and generates an operation signal of 24 volts D.C., for example. The boxes 106 and 107 are supplied with a power source voltage of 100 volts A.C., but the boxes 106 and 107 respectively have a built-in continuous-charge type battery so as to provide a back-up in the event of a power failure.

A power box 108 receives the operation signal from the operation box 107 and operates a solenoid so as to open a gas cylinder 109 in which $CO_2$ gas is sealed. The $CO_2$ gas ejected from the gas cylinder 109 passes through pipe arrangements 110a, 110b, 110c and 110d and is supplied to upper chambers 111a and 111b. The upper chamber 111a is located within the cylinder 100a between the cylinder 100a and the piston 101a. The upper chamber 111b is located within the cylinder 100b between the cylinder 100b and the piston 101b. Hence, the pistons 101a and 101b are pushed downwardly by the pressure of the $CO_2$ gas against the forces exerted by the spring means 102a and 102b, and the pads 104a and 104b separate from the lower surface of the upper bed 11. Therefore, the braking of the upper bed 11 by the action of the pads 104a and 104b is released, and the vibration isolating mechanism (not shown) provided between the upper bed 11 and the lower bed 13 can freely perform the vibration isolating operation described before.

When the earthquake stops, a manual discharge value 112 is opened so as to discharge the $CO_2$ gas within the upper chambers 111a and 111b via the pipe arrangements 110c, 110d, 110b, 110e and 110f. As a result, the pistons 101a and 101b are moved upwardly by the forces exerted by the spring means 102a and 102b, and the pads 104a and 104b make contact with the lower surface of the upper bed 11 so as to again apply the braking with respect to the upper bed 11.

In the case where the earthquake vibration is extremely large, there is a possibility that the pipe arrangements 110a through 100d are damaged after the power box 108 once operates to eject the $CO_2$ gas from the gas cylinder 108 and the pistons 101a and 101b move upwardly. In this case, the pressure of the $CO_2$ gas inside the cylinders 100a and 100b decreases or the $CO_2$ gas completely escapes from the cylinders 100a and 100b. This means that while the earthquake vibration still continues, the pistons 101a and 101b may move upwardly due to the forces exerted by the spring means 102a and 102b to result in the braking of the upper bed 11 by the pads 104a and 104b. If this should happen, the vibration isolating operation will be interfered with. Accordingly, description will now be given with respect to an embodiment in which such an inconvenient situation will not occur even when the pipe arrangements are damaged, by referring to FIG. 13.

Figure 13:
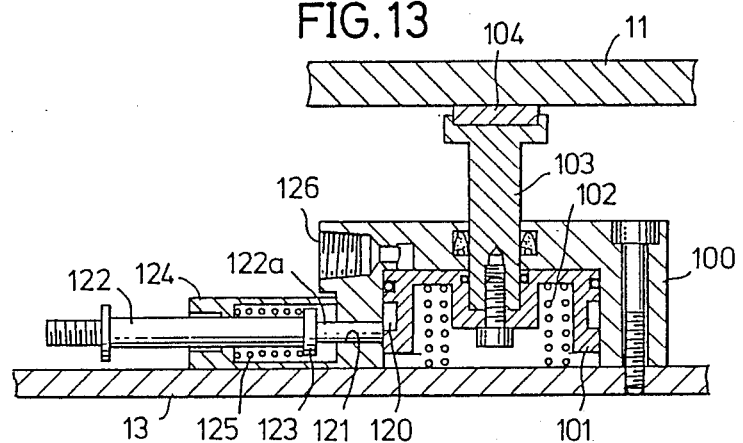
FIG. 13 is a view in vertical cross section showing a concrete construction of an essential part of the vibration isolating apparatus shown in FIG. 12.

In FIG. 13, an engaging groove 120 is provided on a piston 101. A tip end portion 122a of a locking rod 122 is inserted into a hole 121 in a cylinder 100. The locking rod 122 is urged rightwardly in FIG. 13 by a spring 125. A flange 123 is fixed to the locking rod 122, and the spring 125 is loaded in a compressed state between the flange 123 and a housing 124. Normally, the piston 101 is in a raised position due to the force exerted by a spring 102, and a pad 104 pushes against the lower surface of the upper bed 11 so as to apply a braking force with respect to a horizontal movement of the upper bed 11. In this state, the tip end of the locking rod 122 makes contact with an outer peripheral wall of the piston 101.

When the earthquake vibration is over a predetermined degree, the gas cylinder 109 is opened as described before in conjunction with FIG. 12, and the gas is supplied from a gas pressure introducing hole 126 to the cylinder 100 via the pipe arrangements 110a through 110d. Accordingly, the piston 101 is moved downwardly by the pressure of the gas supplied to the cylinder 100 and the pad 104 separates from the lower surface of the upper bed 11 to release the braking. When the piston 101 moves downwardly by a predetermined quantity and the engaging groove 120 opposes the tip end of the locking rod 122, the tip end of the locking rod 122 which is urged rightwardly by the spring 125 fits into the engaging groove 120. As a result, the piston 101 is locked in a lowered position by the locking rod 122. Therefore, even when the cylinder 100 is damaged by the earthquake and the gas inside the cylinder escapes, the piston 101 is prevented from moving upwardly, and the pad 104 will not push against the lower surface of the upper bed 11.

When the earthquake stops and the vibration isolating apparatus is to be returned to the original state, the gas inside the cylinder 100 is discharged via the valve 112 as described before, and the locking rod 122 is slid leftwardly in FIG. 13 against the force exerted by the spring 125. In this state, the piston 101 moves upwardly due to the force exerted by the spring 102, and the tip end of the locking rod 122 again makes contact with the outer peripheral wall of the piston 101.

Further, the present invention is not limited to these embodiments, but various variations and modifications may be made without departing from the scope of the present invention.

What is claimed is:
1. A vibration isolating apparatus comprising:
an upper bed which is adapted to have an object placed thereon;
a lower bed which directly receives an external vibration, said lower bed having a plurality of fixing portions;
support means for supporting said upper bed so that said upper bed is relatively displaceable with respect to said lower bed in a horizontal direction with a small friction;
a plurality of guide members separated from each other and provided on said upper and/or lower beds;
a plurality of wires each arranged in a form of an open loop; and
a plurality of gas springs for absorbing a tension in a corresponding wire depending on a deformation of a shape of the open loop formed by said corresponding wire due to a displacement of said lower bed with respect to said upper bed caused by the external vibration, each gas spring comprising a cylinder portion with one closed end, a gas which is sealed inside said cylinder portion, a guide located at the other end of said cylinder portion, and a rod portion guided by said guide and having one end within said cylinder portion and the other end extending out of the cylinder portion,
each of said plurality of wires being arranged around some guide members of said plurality of guide members so that said each wire passes around a guide member provided on one of said upper and lower beds after another guide member provided on the other of said upper and lower beds, said each wire having one end engaged with a corresponding one of said plurality of fixing portions, and the other end engaged with the rod portion or the cylinder portion of a corresponding gas spring so that a length of said corresponding gas spring is variable.

2. A vibration isolating apparatus as claimed in claim 1 in which two wires of said plurality of wires are arranged so that an open part of the open loop formed by one of said wires and an open part of the open loop formed by the other of said wires oppose each other.

3. A vibration isolating apparatus as claimed in claim 1 in which said support means comprises supports fixed to one of said upper and lower beds, and slide plates provided on the other of said upper and lower beds, said slide plates having a small coefficient of friction and making contact with tip ends of said supports.

4. A vibration isolating apparatus as claimed in claim 3 in which said support means further comprises friction reducing members provided on the tip ends of said supports, said friction reducing members having a small coefficient of friction.

5. A vibration isolating apparatus as claimed in claim 1 in which said support means comprises spherical bearings fixed to one of said upper and lower beds, and slide plates provided on the other of said upper and lower beds, said slide plates having a high hardness and making contact with said spherical bearings.

6. A vibration isolating apparatus as claimed in claim 1 which further comprises braking means provided on one of said upper and lower beds for braking the other of said upper and lower beds by friction so that said upper bed is not displaceable with respect to said lower bed in the horizontal direction, and brake releasing means for detecting the external vibration and for releasing the braking by said braking means.

7. A vibration isolating apparatus as claimed in claim 6 in which said braking means comprises a cylinder fixed to one of said upper and lower beds, a piston provided slideable upwardly and downwardly within said cylinder, a friction member provided on a tip end of a rod which is fixed to said piston, said friction member having a large coefficient of friction and making contact with the other of said upper and lower beds, and another spring means for urging said piston and said friction member in a direction towards the other of said upper and lower beds, said brake releasing means comprising a seismoscope for detecting the external vibration, means for releasing a gas sealed inside a gas cylinder depending on the external vibration detected by said seismoscope, and a pipe arrangement for supplying the gas released from the gas cylinder into said cylinder, said gas supplied into said cylinder displacing said piston against a force exerted by said other spring means so as to separate said friction member from the other of said upper and lower beds.

8. A vibration isolating apparatus as claimed in claim 7 in which said braking means further comprises locking means for locking said piston at a position to which said piston is displaced by a pressure of the gas supplied into said cylinder.

* * * * *